(12) United States Patent
Kim

(10) Patent No.: US 7,677,156 B2
(45) Date of Patent: Mar. 16, 2010

(54) PISTON LOAD OF VEHICLE HEIGHT ADJUSTING SHOCK ABSORBER AND METHOD OF MACHINING THE SAME

(75) Inventor: Hak Kyu Kim, Iksan-si (KR)

(73) Assignee: Mando Corporation, Seoul (KR)

(*) Notice: Subject to any disclaimer, the term of this patent is extended or adjusted under 35 U.S.C. 154(b) by 518 days.

(21) Appl. No.: 11/621,496

(22) Filed: Jan. 9, 2007

(65) Prior Publication Data

US 2007/0169784 A1     Jul. 26, 2007

(30) Foreign Application Priority Data

Jan. 20, 2006   (KR) .................. 10-2006-0006195

(51) Int. Cl.
*F01B 31/00*  (2006.01)
*F16F 9/50*   (2006.01)

(52) U.S. Cl. .......................... 92/110; 92/129

(58) Field of Classification Search ................ 92/85 B, 92/109, 110, 129, 134; 188/322.22, 321.11
See application file for complete search history.

(56) References Cited

U.S. PATENT DOCUMENTS

| | | | |
|---|---|---|---|
| 4,419,804 A | 12/1983 | Axthammer | |
| 4,453,638 A | 6/1984 | Wallace | |
| 5,042,624 A | 8/1991 | Furuya et al. | |
| 5,062,616 A * | 11/1991 | Sommer | 188/322.17 |
| 5,063,828 A * | 11/1991 | Kamimura | 92/110 |
| 5,305,860 A | 4/1994 | Rotharmel et al. | |
| 5,988,655 A | 11/1999 | Sakai et al. | |
| 6,223,649 B1 * | 5/2001 | Beck et al. | 92/109 |
| 7,197,975 B2 * | 4/2007 | Boll et al. | 92/110 |

FOREIGN PATENT DOCUMENTS

| | | |
|---|---|---|
| EP | 0186355 | 7/1986 |
| JP | 58-146742 | 9/1983 |
| JP | 314933 A | 1/1991 |
| JP | 04-370428 | 12/1992 |
| JP | 11-101292 | 4/1999 |
| JP | 2000-234643 | 8/2000 |
| JP | 2003-042214 | 2/2003 |
| WO | WO 92/16769 | 10/1992 |

OTHER PUBLICATIONS

U.S. Appl. No. 11/621,492, entitled, "Piston Load of Vehicle Height Adjusting Shock Absorber and Method of Machining the Same," filed Jan. 9, 2007.
Kim, Hak Kyu, U.S. Appl. No. 11/621,492, for "Piston Load of Vehicle Height Adjusting Shock Absorber and Method of Machining the Same," filed Jan. 9, 2007.

* cited by examiner

*Primary Examiner*—Thomas E Lazo
(74) *Attorney, Agent, or Firm*—Seed IP Law Group PLLC

(57) ABSTRACT

A piston rod installed to a vehicle height adjusting shock absorber includes a body portion having a hollow portion with first and second ends that are open. A step portion extends inwardly into the hollow portion a predetermined length from the first end of the hollow portion, the step portion having a thread formed on an inner surface thereof. A guide member threadly engaged to the step portion to plug the open hollow portion.

9 Claims, 4 Drawing Sheets

PISTON LOAD OF VEHICLE HEIGHT ADJUSTING SHOCK ABSORBER AND METHOD OF MACHINING THE SAME

BACKGROUND OF THE INVENTION

The present invention relates to a piston rod of a vehicle height adjusting shock absorber, and more particularly, to a method of manufacturing the hollow section of the piston rod to increase the accuracy and smoothness of the hole and increase the ease of cleaning out burrs and chips from the machined hole.

In general, a vehicle is equipped with shock absorbers for improving the ride comfort during driving conditions by absorbing shocks or vibrations transferred from the road to the axle. The shock absorber is installed between an axle and the vehicle body, and the interior thereof is filled with gas or oil in order to increase damping force.

In addition to absorbing shocks to the vehicle, the shock absorbers provide the ability to keep the height of the vehicle constant regardless of the number of passengers or the baggage weight loaded. Such a shock absorber is classified as a vehicle height adjusting shock absorber.

A conventional vehicle height adjusting shock absorber includes a base shell, an inner tube installed inside the base shell, a blade, and an outer tube. The blade and the outer tube are longitudinally installed between the base shell and the inner tube. A piston rod is also installed in the inner tube, and the other end of the piston rod has an upper eye, which attaches to the vehicle body.

FIG. 1 is a sectional view of a part of a conventional piston rod, and FIG. 2 is a sectional view showing the upper eye separated from the piston rod.

As shown in FIGS. 1 and 2, in a conventional piston rod 10, a coupling recess portion 12 to be coupled with an upper eye 20 is formed in an upper end of the piston rod 10. A thread 12a is machined on an inner surface of the coupling recess portion 12. In addition, the piston rod 10 is formed with a hollow portion 14 into which a pump tube is to be inserted. Meanwhile, the upper eye 20 includes a ring portion 22 and a coupling portion 24 integrally formed with the ring portion 22. The ring portion 22 includes inner and outer rings 22a, 22b to be coupled with the vehicle body. The coupling portion 24 is coupled to the coupling recess portion 12 of the piston rod 10. The coupling portion 24 is formed with a thread 24a configured to be engaged with the thread 12a formed in the coupling recess portion 12.

The piston rod 10 is made of a solid rod, in which the hollow portion 14 and coupling recess portion 12 are formed by machining both ends of the circular rod by means of a tool such as a gun drill.

However, in case of the piston rod 10 of the conventional vehicle height adjusting shock absorber, if the hollow portion 14 is long, eccentricity between an axial of the hollow portion 14 and an axial of the piston rod 10 occurs during the process of machining the hollow portion 14. Thus, the straightness of the hollow portion 14 is deteriorated and the machined inner surface of the hollow portion 14 is not smooth. Accordingly, friction and wear can occur between the hollow portion 14 and the pump tube, and if severe, the products can be deformed.

Further, it is difficult to remove chips generated in the hollow portion 14 when it is machined, which can clog the inner channel of the shock absorber after the machining.

In addition, since the piston rod 10 is machined from a solid rod, there are problems in that the increased working time is required and the manufacturing costs are increased.

SUMMARY OF THE INVENTION

The present invention is conceived to solve the aforementioned problems in the prior art. An object of the present invention is to provide a piston rod of a vehicle height adjusting shock absorber, in which a member with a hollow portion formed therein, such as a pipe, is used in a machining process of the piston rod, thereby improving the degree of cleanness in the hollow portion of the piston rod, and easily managing its eccentricity to reduce inferior products, and a method of machining the piston rod.

According to an aspect of the present invention for achieving the object, there is provided a piston rod installed to a vehicle height adjusting shock absorber. The piston rod comprises a body portion having a hollow portion formed therein and both ends opened; a step portion stepwise formed inwardly by a predetermined length from one end of the hollow portion, the step portion having a thread formed on an inner surface thereof; and a guide member threadly engaged to the step portion to plug the open hollow portion.

The guide member may comprise a coupling portion formed with a thread corresponding to the thread of the step portion, a plug portion formed in the coupling portion to be inserted into the hollow portion. Also, the piston rod may further comprise an O-ring installed to at least any one of the plug portion and the hollow portion corresponding thereto to seal a gap therebetween.

In addition, according to another aspect of the present invention for achieving the object, there is provided a method of machining a piston rod installed to a vehicle height adjusting shock absorber. The method comprises the steps of providing a body portion having a hollow portion formed therein and both ends opened; forming a step portion stepped inwardly by a predetermined length by machining an end of the hollow portion; forming a thread on the step portion; and engaging a guide member to the thread to plug an opening of the hollow portion after providing the guide member corresponding to the hollow portion.

In the engaging step, the guide member may comprise a coupling portion formed with a thread corresponding to the thread of the step portion, a plug portion formed in the coupling portion to be inserted into the hollow portion. Also, the method may further comprise the step of installing an O-ring to at least any one of the plug portion and the hollow portion corresponding thereto to seal a gap therebetween.

DETAILED DESCRIPTION OF EMBODIMENTS

Hereinafter, an embodiment according to the present invention will be described in detail with reference to the accompanying drawings.

Figure 1:
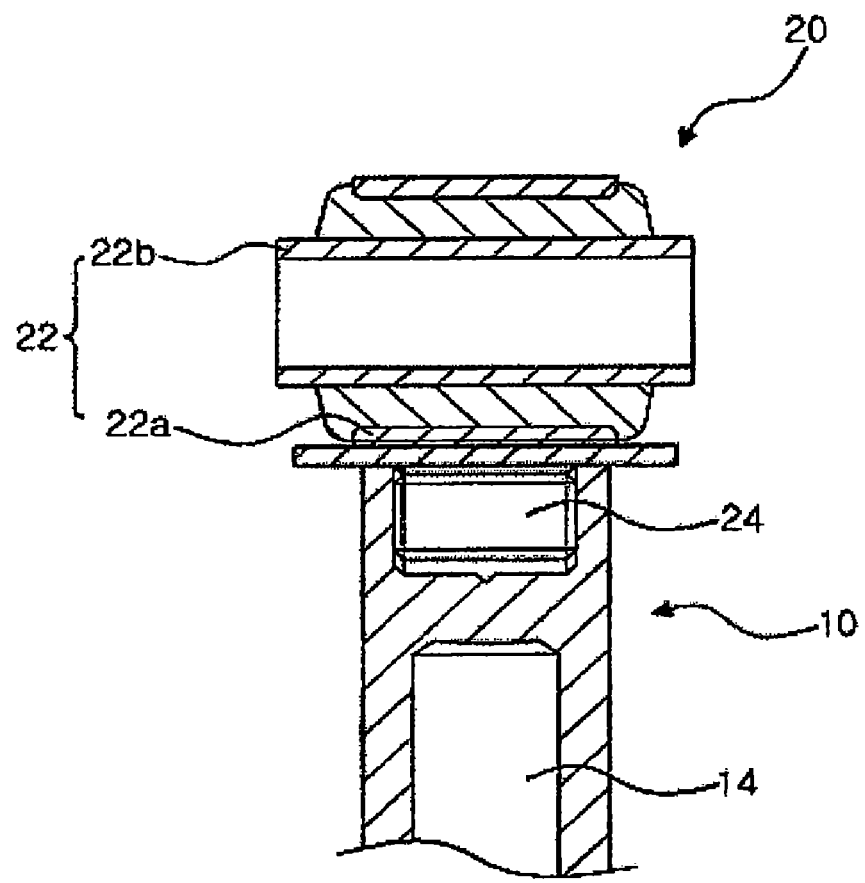
FIG. 1 is a sectional view of a part of a conventional piston rod.
Figure 2:
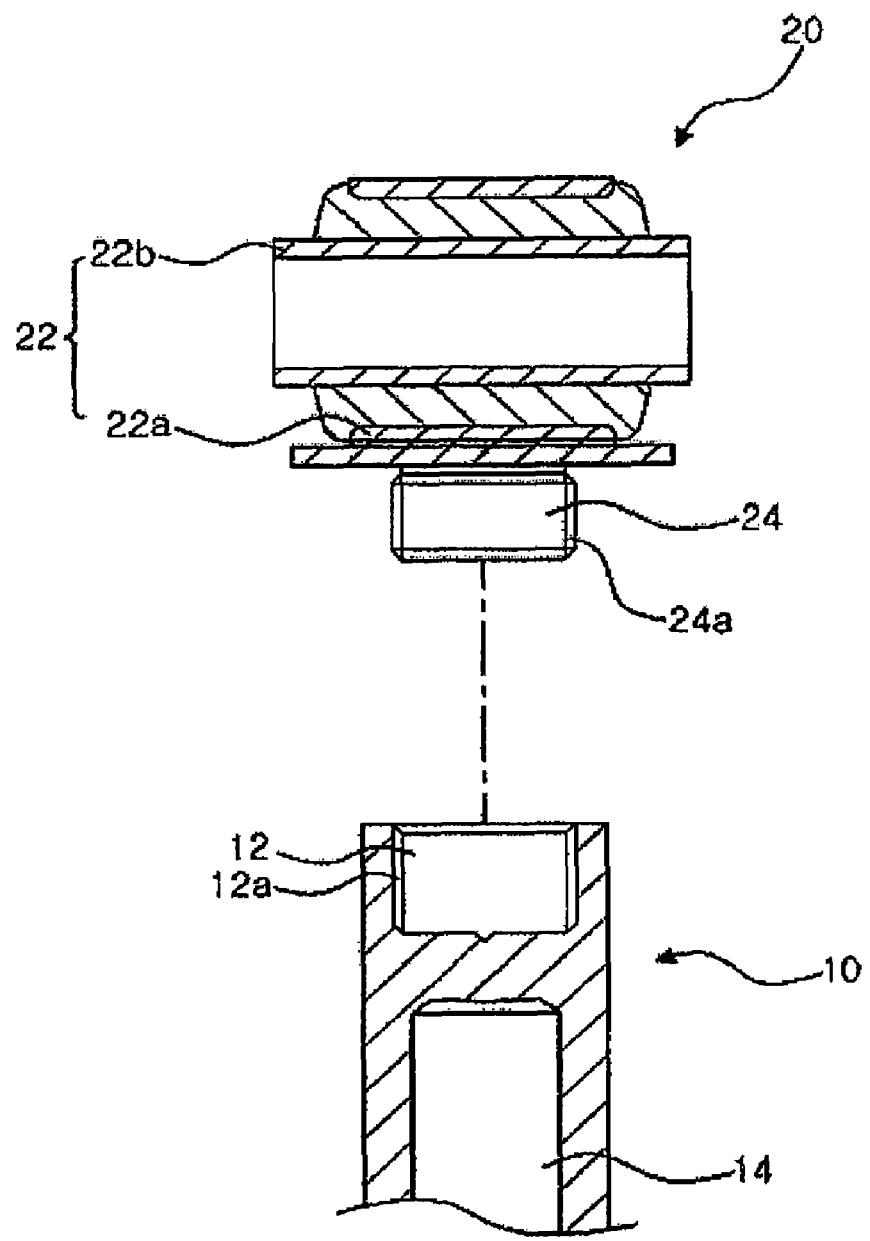
FIG. 2 is a sectional view showing the upper eye separated from the part of the conventional piston rod.
Figure 3:
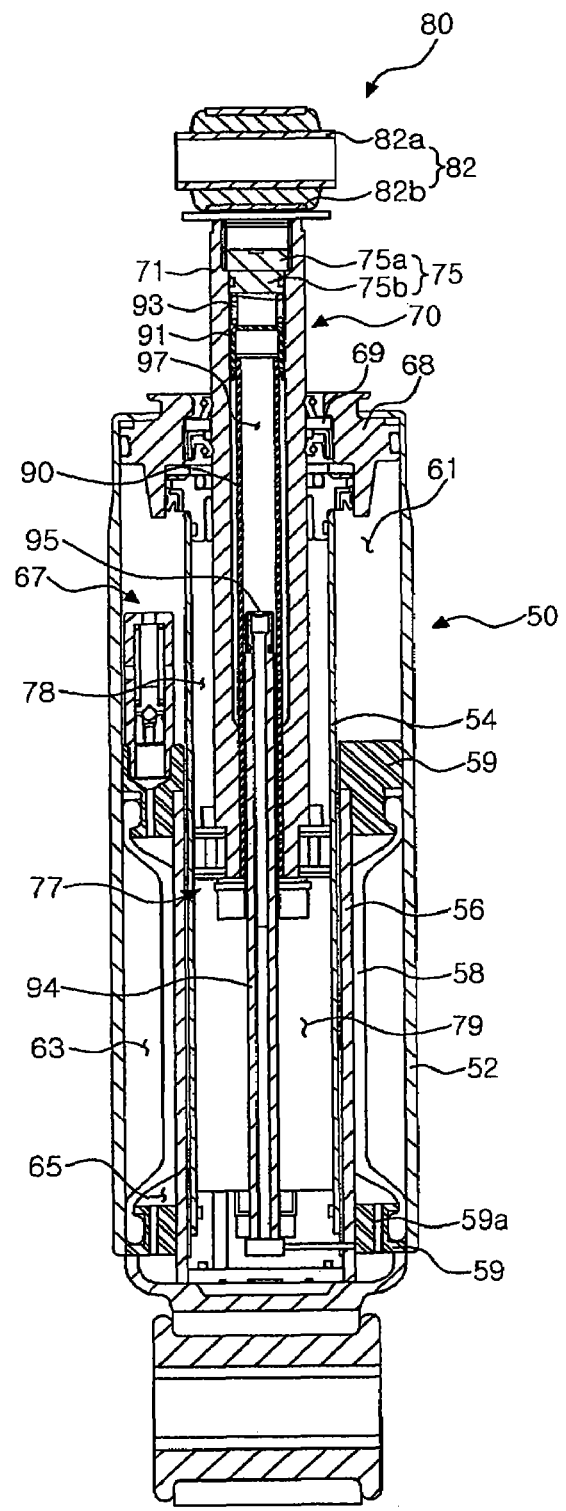
FIG. 3 is a sectional view of a vehicle height adjusting shock absorber having a piston rod according to the present invention.
Figure 4:
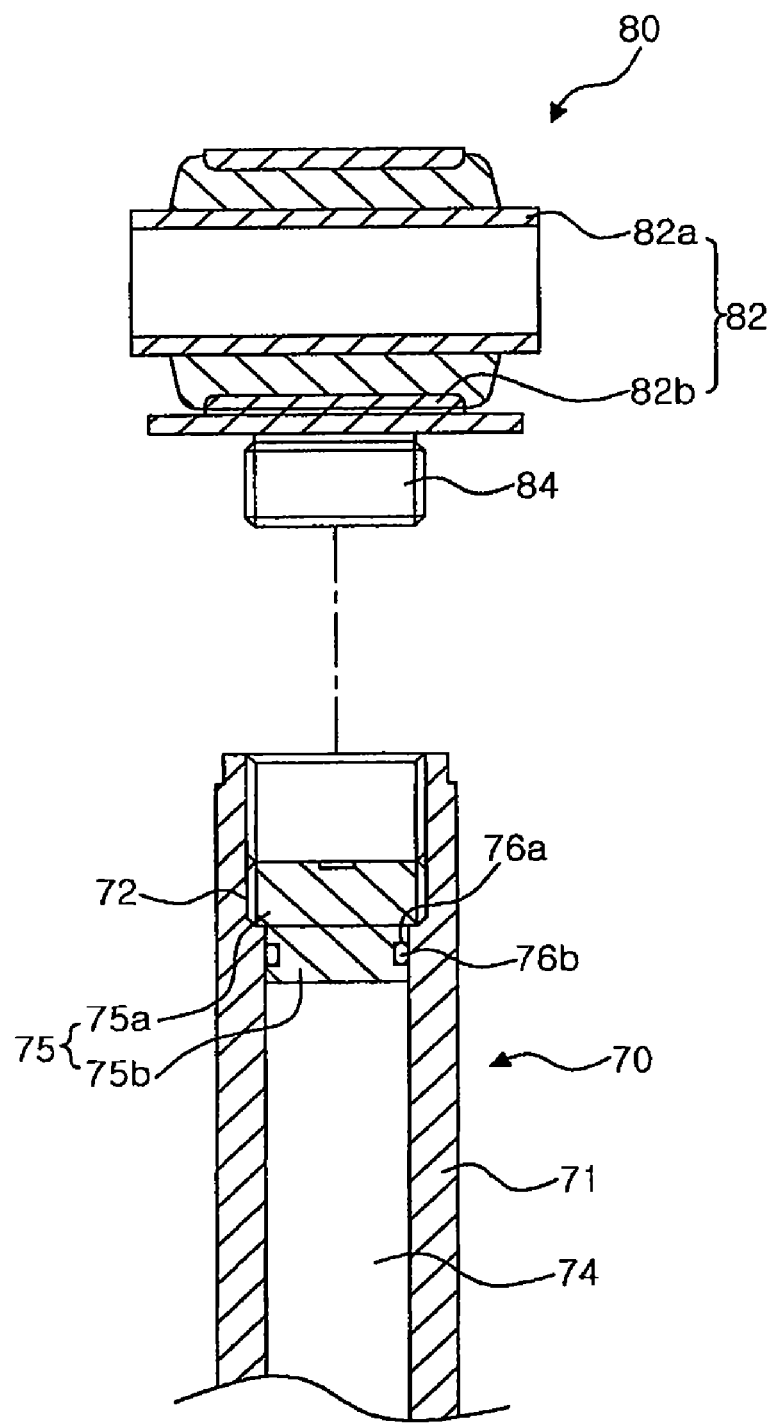
FIG. 4 is a sectional view showing the upper eye separated from a part of the piston rod according to the present invention.

FIG. 3 is a sectional view of a vehicle height adjusting shock absorber having a piston rod according to the present invention, and FIG. 4 is a sectional view showing that an upper eye is separated from a part of the piston rod according to the present invention.

As shown in FIG. 3, a vehicle height adjusting shock absorber 50 according to the present invention includes a base shell 52, an inner tube 54 installed inside the base shell 52, an outer tube 56, and a blade 58. The outer tube 56 and the blade 58 are longitudinally installed between the base shell 52 and the inner tube 54.

The blade 58 is fixed by brackets 59 installed between the base shell 52 and the outer tube 56. Preferably, both ends of the blade 58 are shaped (e.g., bent) so as to contact the base shell 52 and define an enclosed space. In addition, the bracket 59 is formed with a vent 59a to allow the chambers separated by the bracket to connect with each other.

A space enclosed between the inner tube 54 and the base shell 52 defines a base chamber 61. A space enclosed by the blade 58 and the base shell 52 and a space enclosed by the blade 58 and the outer tube 56 respectively define a gas chamber 63 and a high pressure chamber 65. In addition, a relief valve 67 for maintaining the pressure in the high pressure chamber 65 is installed on a side of the outer tube 56.

In the meantime, a piston rod 70 is installed inside the inner tube 54 and a rod guide 68 and an oil seal 69 are installed in the upper end of the inner tube 54 to guide the movement of the piston rod 70.

A piston valve 77 is installed at an end of the piston rod 70 to divide the interior of the inner tube 54 into an rebound chamber 78 and a compression chamber 79 and to control the flow of fluid between the rebound chamber 78 and the compression chamber 79.

In the meantime, the piston rod 70 has a hollow pump tube 90 installed therein to adjust the height of the vehicle. A hollow pump rod 94 is inserted into the pump tube 90, so that a pump chamber 97 is defined in a space between the pump tube 90 and the pump rod 94. In addition, an inlet valve 95 is provided in the upper end of the pump rod 94, and an outlet valve 91 (opened and closed by the up and down operation of the piston rod) is provided in an upper end of the pump tube 90. The outlet valve 91 is supported at its upper portion by a spring 93 positioned thereon. When the spring 93 is compressed, the outlet valve 91 is opened.

To this end, as shown in FIG. 4, the piston rod 70 includes a body portion 71 in which a hollow portion 74 is formed in an axial direction, and both ends of the hollow portion 74 are open. In addition, the body portion 71 is formed with a step portion 72 which is stepwise formed inwardly by a predetermined length from an end of the hollow portion 74. Further, a thread is machined on the step portion 72.

Preferably, the body portion 71 is a pipe, in which the hollow portion 74 is previously formed. The step portion 72 can be formed by machining the interior of the hollow portion of the body portion to the desire diameter.

In addition, a guide member 75 for plugging the end of the hollow portion 74 is inserted into the hollow portion 74. The guide member 75 includes a coupling portion 75a formed with a thread corresponding to the thread of the step portion 72. In one embodiment, the coupling portion 75a is integrally formed with the plug portion 75b inserted into the hollow portion 74. Accordingly, in the guide member 75, the plug portion 75b plugs the opening of the hollow portion 74, and the coupling portion 75a engages with the step portion 72. Although the coupling portion 75a and the plug portion 75b is formed as an integrated single piece in the present embodiment, they may be separate pieces that are joined or secured together.

Meanwhile, a predetermined groove 76a is formed in a peripheral part of the plug portion 75b which is in close contact with the hollow portion 74, and an O-ring 76b is inserted into the groove 76a to seal a gap between the body portion 71 and the plug portion 75b.

Further, an upper eye 80 is engaged to an upper end of the step portion 72 of the piston rod 70 in order to attach to the vehicle body. The upper eye 80 includes a ring portion 82 having inner and outer rings 82a, 82b to be attached to the vehicle body, and a coupling portion 84 engaged to the upper end of the step portion 72 of the piston rod 70. The coupling portion 84 is formed with a thread corresponding to the thread of the step portion 72 to be engaged therewith.

A method of machining the piston rod so configured will be described as follows.

First, there is provided the body portion 71, such as a pipe, having the hollow portion 74 formed therein. The step portion 72 is stepwise formed inwardly by the predetermined length from the end of the hollow portion 74. Then, the thread is formed by machining the inner surface of the step portion 72.

Next, there is provided the guide member 75 corresponding to the hollow portion 74. The guide member 75, which includes the coupling portion 75a engaged to the step portion 72, and the plug portion 75b inserted into the hollow portion 74, is screwed into the thread of the step portion 72.

Further, the plug portion 75b is formed with the groove 76a of a predetermined size, and the O-ring 76b is coupled to the groove 76a to seal the gap between the hollow portion 74 and the groove 76a.

As described above, the guide member 75 is inserted into and engaged to the step portion 72, and then, the coupling portion 84 of the upper eye 80 is screwed to the top of the guide member 75.

As described above, in a case where a piston rod of a vehicle height adjusting shock absorber is made using a pipe, there is no need for an additional machining work for forming a hollow portion in the piston rod. Accordingly, the shock absorber is easily manufactured, and thus the working speed is improved. In addition, since the hollow portion is machined by means of a tool such as a gun drill, the eccentricity is easily managed. Also, a degree of cleanness for a machined inner surface is improved, thereby improving the quality of the product.

The piston rod of a vehicle height adjusting shock absorber according to the present invention so configured and the method of machining the piston rod use a member with an interior being hollow. Therefore, the piston rod is easily manufactured since there is no need for additional machining of the interior of the piston rod, thereby improving the manufacturing yield. Also, the eccentricity is easily managed in manufacturing the hollow portion, so that the linearity of the hollow portion can be improved. Further, a degree of cleanness for the machined inner surface can be improved, thus to enhance the quality of the product. Since the linearity of the hollow portion is improved as described above, the hollow portion does not interfere with the pump rod installed therein, thereby enhancing the durability and stability of the products.

Although the piston rod of a vehicle height adjusting shock absorber according to the present invention and the method of machining the piston rod are described with reference to the illustrated drawings, the present invention is not limited to the aforementioned embodiment and drawings. It will be apparent that those skilled in the art can make various modifications and changes thereto within the scope of the invention defined by the claims.

For example, although it has been described in the embodiment of the present invention that the O-ring for improving the sealing force of the piston rod is coupled to the groove formed in the plug portion or upper eye, it is possible to form a groove in the hollow portion at the corresponding position when the guide member is engaged and then to couple the O-ring thereto.

What is claimed is:

1. A piston rod assembly of a height adjusting shock absorber of a vehicle, the piston rod assembly comprising:
   a body having a first end and a second end;
   a hollow region extending entirely through the body from the first end to the second end, the hollow region divided into a first chamber and a second chamber;
   a stepped portion forming a wall of the first chamber and extending a predetermined distance from the first end into the hollow portion, the stepped portion having a diameter larger than a diameter of the second chamber, a step being positioned between the first chamber and the second chamber;
   a guide member including a plug member and a coupling member coupled to the plug member, forming a unit, the plug member sealingly engaging an inner surface of the second chamber adjacent the step to seal the second chamber from the first chamber, the coupling member threadedly engaging the stepped portion to securely retain the guide member; and
   a connection member coupled to the stepped portion between the coupling member of the guide member and the first end of the body, to connect the piston rod assembly to the vehicle.

2. The piston rod assembly as claimed in claim 1, wherein the coupling member and the plug member are separate components joined to each other to form the unit.

3. The piston rod assembly as claimed in claim 1, wherein the coupling member and the plug member are formed from a unitary body of material.

4. The piston rod assembly as claimed in claim 1, further comprising:
   an O-ring installed to the plug member or to the hollow portion corresponding thereto, or both, to seal a gap between the hollow portion and the plug member.

5. A method of manufacturing a piston rod assembly of a height adjusting shock absorber of a vehicle, the method comprising:
   machining an inner surface of a hollow body from a first end of the hollow body to a predetermined distance from the first end to form a stepped portion defining a wall of a first chamber and a step between the first chamber and a second chamber having a smaller diameter than the first chamber;
   threadedly engaging a coupling member of a guide member to the stepped portion between the step and the first end;
   sealingly engaging a plug member of the guide member to the second chamber adjacent the step, the plug member being coupled to the coupling member to form a unit; and
   engaging a connection member to the stepped portion between the coupling member of the guide member and the first end of the body to couple the piston rod assembly to the vehicle.

6. The method as claimed in claim 5, further comprising:
   installing an O-ring to the plug member, the second chamber or both, to seal a gap between the plug member and the second chamber.

7. The method as claimed in claim 5, wherein the plug member and the coupling member are formed from a unitary body of material.

8. The method as claimed in claim 5, wherein the plug member and the coupling member are separate pieces coupled to each other to form the unit.

9. A piston rod installed to a vehicle height adjusting shock absorber, the piston rod comprising:
   a body portion having a hollow portion with first and second ends that are open;
   a stepped portion extending inwardly by a predetermined length from the first end of the hollow portion, the stepped portion having a thread formed on an inner surface thereof;
   a guide member threadedly engaged to the stepped portion to plug the open hollow portion, the guide member including a coupling portion and a plug portion, the coupling portion having a thread corresponding to the thread of the stepped portion to be threadedly coupled thereto between an inward end of the stepped portion and the first end of the hollow portion, the plug portion configured to plug the hollow portion toward the inward end of the stepped portion; and
   a connection member distinct from the guide member engaged to the stepped portion so as to connect the piston rod to a vehicle body.

* * * * *